UNITED STATES PATENT OFFICE.

JOHN J. CROOKE, OF NEW YORK, N. Y., ASSIGNOR OF ONE-HALF TO ROBERT CROOKE, OF YONKERS, NEW YORK.

PROCESS OF CONVERTING SALT-MARSH MATERIAL, &c., INTO A FERTILIZER AND THE PRODUCT RESULTING THEREFROM.

SPECIFICATION forming part of Letters Patent No. 712,045, dated October 28, 1902.

Application filed February 21, 1902. Serial No. 95,130. (No specimens.)

*To all whom it may concern:*

Be it known that I, JOHN J. CROOKE, a citizen of the United States, residing at New York, in the county of Richmond and State of New York, (whose post-office address is Great Kills, New York,) have invented a new and useful Process of Converting Salt-Marsh Material or Similar Material into a Fertilizer and the Product or Fertilizer Resulting from such Process, of which the following is a specification.

There are in this and most other countries extensive tracts of level land bordering the ocean and its bays and estuaries which are frequently covered or at some time have been covered by the ocean tides and are known as "salt-marshes" or "salt-meadows." These marshes are immense deposits or beds, often many feet in depth, of material which has been gradually accumulated during long series of years or centuries from the decay of annual crops of saline plants grown upon their surface, from a large variety of organic and inorganic matter in different stages of decomposition washed down from the adjacent uplands, and from the remains of decayed infusorial, testaceous, picine, crustaceous, and other animal and vegetable life brought in and left by the ocean tides. Undoubtedly the decomposition of this material has been continuous from the time of its deposition, as is evidenced by a comparison of the upper and lower strata of the beds, which shows that the material of the lower strata is far more homogeneous, resembling dark-brown and black mud of a fine smooth consistency and texture, while that of the upper strata is coarser and is mixed with roots, fibers, and other organic and inorganic matter in a less-advanced stage of decay or decomposition.

The material of salt-marshes in its native state, as when taken from its bed, although it is rich in humus, an important constituent of fertile soils, and contains other valuable elements and compounds adapted under favorable conditions to promote the growth of cultivated plants or crops, is not a fertilizer, and is not only incapable of enriching the soil and providing plant-food, but is detrimental and injurious thereto, and in some cases is actually poisonous to and destructive of plant life. These results are probably due to the presence in the material of certain acids, as gallic, tannic, acetic, or sulfur acids, and also certain noxious substances and compounds, as iron sulfids, sulfureted and carbureted hydrogen, or an excess of chlorids, some of which are directly destructive of plant life, while others, doubtless by preventing the ready decomposition of the humus or interfering with its normal action as a constituent of the soil, are detrimental and hostile to the growth of plants. For these reasons the humus, which constitutes a large and important ingredient of the salt-marsh material, is called "sour," "cold," and "infertile" humus, as distinguished from the mild or benign humus, which is generally regarded as an essential constituent of all fertile soils.

It is the object of the present invention to provide a cheap and effective method for converting salt-marsh material, especially the more decomposed portions thereof generally found in the lower strata of the beds, as well as other material containing sour humus or with which such humus is intimately associated, into a fertilizer; and to this end the invention consists in subjecting the material to electrolytic action, whereby the contained acids and noxious substances and compounds will be decomposed and eliminated or neutralized and rendered harmless, and the sour humus will be converted into a mild humus and the resulting product will be a fertilizer having a neutral or alkaline reaction and adapted to enrich a variety of soils and furnish the requisite stimulant and food for the germination and growth of cultivated plants and crops.

My process or method may be carried into practice by employing any means and apparatus by which the material is subjected to the action of an electric current of the requisite quantity and voltage to effect the desired electrolysis. A convenient and effective electrolytic cell for this purpose consists of a wooden tank, preferably of rectangular shape and having a capacity of about five tons of the material to be treated and provided with an electrode at each of its sides. The electrodes, preferably of wrought sheet-iron, are of the desired superficial area, arranged to form linings to the opposite sides of the tank, and are electrically connected to the opposite poles of a dynamo or other electric generator having the capacity to generate a current of the requisite quantity and electromotive force to do the desired work.

The material to be treated is charged into the tank and is in a wet or saturated condition. The electric current is turned on and continued until the charge is sufficiently decomposed, which will ordinarily require from three to five hours, depending somewhat upon the efficiency of the current and the nature of the charge.

During the operation hydrogen and other gases and volatile elements, including hydric sulfid, carbureted hydrogen, and chlorin, if present, will be eliminated at the anode, where the charge will be strongly and increasingly acid in the earlier stages of the operation. A strong alkaline reaction will be manifested at the cathode due to the determination to this pole of alkaline salts, and this alkaline condition will gradually extend to the anode as the operation is continued. The current should be kept running until the charge contiguous to the anode is neutral or gives an alkaline reaction. When the operation is completed, the charge is removed from the tank, dried in the air or by artificial heat, and pulverized, when it is in condition to be applied to the land as a fertilizer in substantially the same way and in the same quantity as unleached wood-ashes and many artificial fertilizers.

It is observed that the volatile elements eliminated at the anode-pole, as well as those determined to the cathode during the conversion, both in kind and quantity depend largely upon the composition or character of the material under treatment, which differs in many respects, according to the locality from which it is taken. In any event, however, the electrolytic operation, if properly performed, will destroy or neutralize the acid and noxious characteristics of the material, so that no free acids or plant-poisoning gases remain and will change the sour humus into a mild or benign humus and convert a useless material into a valuable fertilizer.

I am aware that attempts have been made to convert material taken from salt-marshes and peat-bogs into a fertilizer by the so-called "weathering" process, which consists in exposing the material to the action of the elements, whereby it is partially oxidized by contact with the air, leached by rains, and subjected to extremes of temperature, also that it has been a practice to mix with this material alkalies and alkaline compounds, as lime, ashes, marl, and other substances, to counteract and neutralize its injurious sour or acid condition; but while it is undoubtedly true that these processes and operations have been successful in partially converting the material and in removing some of its noxious properties it is nevertheless true that the acid character of the material remains and interferes with its decomposition and its consequent efficiency to form or to assist to form plant-food.

The acid characteristics of humus are so fixed and persistent that they are readily apparent to the proper tests, and this is true even of the so-called "mild" humus and of cultivated soils rich in such humus.

The fertilizer which is the product or result of treating salt-marsh material or other material containing sour humus by my process is distinguishable not only from such material after it has been subjected to the weathering and alkaline treatments hereinbefore referred to and been partially converted thereby, but also from the material of fertile soils rich in so-called "mild" or "benign" humus in that all free acids have been converted or eliminated from my fertilizer and that it is neutral or has an alkaline reaction.

The statements hereinbefore made that salt-marsh material and other material containing sour humus is injurious or destructive to the growth and life of plants are applicable to what are known as "cultivated" plants and crops which provide food for man and domestic animals and not to certain saline grasses, sedge, and rushes which grow upon the surface of marsh and bog lands.

It is not intended to limit this invention to the electrolysis of salt-marsh material, inasmuch as the materials obtained from peat and muck bogs, as well as the dredgings of harbors, bays, and mouths of rivers, which are generally rich in sour humus, can be readily subjected to treatment by the hereinbefore-described process and the contained acids and noxious substances be decomposed and rendered harmless and the resulting product become a fertilizer, and for the purpose of this invention and application such materials are considered similar to the salt-marsh material especially referred to on account of its abundance and richness in humus.

What is claimed as new is—

1. The herein-described process of subjecting salt-marsh material, or other similar material, to electrolysis, whereby the material is converted into a fertilizer.

2. The herein-described fertilizer produced by subjecting salt-marsh material, or similar material, to electrolysis substantially as set forth.

JOHN J. CROOKE.

Witnesses:
JOHN N. MOORE,
ALEXANDER MITCHELL.